US012804560B2

(12) United States Patent
Ling et al.

(10) Patent No.: US 12,804,560 B2
(45) Date of Patent: Nov. 17, 2026

(54) METHOD AND APPARATUS OF POWER HEADROOM REPORT (PHR) REPORTING

(71) Applicant: LENOVO (BEIJING) LIMITED, Beijing (CN)

(72) Inventors: Wei Ling, Beijing (CN); Yi Zhang, Beijing (CN); Chenxi Zhu, Fairfax, VA (US); Bingchao Liu, Beijing (CN); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 249 days.

(21) Appl. No.: 18/720,899

(22) PCT Filed: Apr. 2, 2022

(86) PCT No.: PCT/CN2022/085094
§ 371 (c)(1),
(2) Date: Jun. 17, 2024

(87) PCT Pub. No.: WO2023/184543
PCT Pub. Date: Oct. 5, 2023

(65) Prior Publication Data

US 2025/0056425 A1 Feb. 13, 2025

(51) Int. Cl.
*H04W 52/36* (2009.01)
*H04W 52/24* (2009.01)

(52) U.S. Cl.
CPC ....... *H04W 52/365* (2013.01); *H04W 52/242* (2013.01)

(58) Field of Classification Search
CPC . H04W 52/365; H04W 52/18; H04W 52/242; H04W 52/325; H04L 5/0048
See application file for complete search history.

(56) References Cited

U.S. PATENT DOCUMENTS

| | | | | |
|---|---|---|---|---|
| 11,523,349 | B1 * | 12/2022 | Huang | H04W 52/58 |
| 2022/0201619 | A1 * | 6/2022 | Yao | H04W 52/146 |

(Continued)

FOREIGN PATENT DOCUMENTS

| | | | |
|---|---|---|---|
| CN | 110536402 | A | 12/2019 |
| CN | 114175766 | A | 3/2022 |
| WO | 2021028892 | A1 | 2/2021 |

OTHER PUBLICATIONS

Nokia et al. "Summary #1 of Multi-TRP PUCCH and PUSCH Enhancements" 3GPP TSG RAN WG1 #107-e R1-2112583, Nov. 19, 2021; 47 pages.

(Continued)

*Primary Examiner* — Yuwen Pan
*Assistant Examiner* — Samuel H. Leonard
(74) *Attorney, Agent, or Firm* — AMPACC Law Group, PLLC

(57) ABSTRACT

Embodiments of the present application are related to a method and apparatus of power headroom report (PHR) reporting. An exemplary method of the present application includes: receiving configuration information, indicating two sounding reference signal (SRS) resource sets and two power headroom reports (PHR)s to be reported for an activated bandwidth part of a serving cell, wherein a first SRS resource set of the two SRS has a lower identifier than a second SRS resource set of the two SRS resource sets; and transmitting the two PHRs according to two power control parameter sets associated with the two SRS resource sets.

8 Claims, 4 Drawing Sheets

(56) References Cited

U.S. PATENT DOCUMENTS

| | | | | |
|---|---|---|---|---|
| 2022/0217653 | A1* | 7/2022 | Kung | H04W 52/367 |
| 2022/0217654 | A1* | 7/2022 | Kang | H04W 52/346 |
| 2022/0353892 | A1* | 11/2022 | Cirik | H04L 5/0096 |
| 2024/0031948 | A1* | 1/2024 | Zhang | H04B 7/0404 |
| 2024/0056986 | A1* | 2/2024 | Jeon | H04W 52/365 |
| 2024/0056987 | A1* | 2/2024 | Cirik | H04W 52/365 |
| 2024/0107465 | A1* | 3/2024 | Yuan | H04B 7/06956 |
| 2024/0155502 | A1* | 5/2024 | Lin | H04W 52/36 |
| 2024/0155508 | A1* | 5/2024 | Deghel | H04W 52/146 |
| 2024/0188004 | A1* | 6/2024 | Liu | H04L 5/0091 |
| 2024/0298271 | A1* | 9/2024 | Gao | H04L 5/0048 |
| 2024/0389101 | A1* | 11/2024 | Guo | H04W 52/0258 |
| 2025/0031155 | A1* | 1/2025 | Yuan | H04W 52/365 |
| 2025/0142489 | A1* | 5/2025 | Gao | H04W 72/0473 |
| 2026/0101290 | A1* | 4/2026 | Canonne-Velasquez | H04W 52/365 |

OTHER PUBLICATIONS

Nokia et al. "Summary #2 of Multi-TRP PUCCH and PUSCH Enhancements" 3GPP TSG RAN WG1 #107-e R1-2112584, Nov. 19, 2021; 12 pages.

International Search Report and Written Opinion dated Nov. 30, 2022 for International Application No. PCT /CN2022/085094.

European search report dated Sep. 5, 2025 for European Patent Application No. 22934370.2.

Asustek: "Discussion on mTRP PUSCH", 3GPP TSG-RAN WG1 #107-e; R1-2112269; Nov. 19, 2021; 7 pages.

Fgi et al: "Discussion on enhancements on multi-TRP for uplink channels", 3GPP TSG-RAN WG1 #106-e; R1-2107293; Aug. 27, 2021; 7 pages.

* cited by examiner

METHOD AND APPARATUS OF POWER HEADROOM REPORT (PHR) REPORTING

CROSS REFERENCE TO RELATED APPLICATIONS

This application is a national phase entry of International Application No. PCT/CN2022/085094, filed on Apr. 2, 2022, which is incorporated by reference in its entirety.

TECHNICAL FIELD

Embodiments of the present application generally relate to wireless communication technology, especially to a method and an apparatus of power headroom report (PHR) reporting for multiple transmit-receive point (TRP) (also referred to as multi-TRP, or M-TRP) transmission.

BACKGROUND

Multi-TRP/panel transmission has been introduced into new radio (NR) since release 16 (Rel-16). During multi-TRP transmission, two or more TRPs (or panels) may be used to transmit data to a user equipment (UE) to improve reliability and robustness. In addition, enhancements on multiple-input multiple-output (MIMO) for NR are always discussed. A work item description (WID) approved on MIMO in NR Rel-17 includes enhancement on the support for multi-TRP deployment, targeting both frequency range (FR)1 and FR2. Wherein, a research topic is to identify and specify features to improve reliability and robustness for channels other than physical downlink shared channel (PDSCH), e.g., physical downlink control channel (PDCCH), physical uplink shared channel (PUSCH), and physical uplink control channel (PUCCH) using multi-TRP and/or multi-panel, with Rel-16 reliability features as the baseline.

Regarding PUSCH, it has been agreed that two power headroom reports can be reported for multi-TRP based PUSCH. However, there are still several technical problems concerning PHR reporting for multiple TRP based PUSCH needed to be solved, including but not being limited to: how to calculate (or determine) virtual PHR(s) in multiple TRP based PUSCH.

SUMMARY OF THE APPLICATION

One objective of the embodiments of the present application is to provide a technical solution of PHR reporting, especially, a method and an apparatus of PHR reporting for multi-TRP transmission.

According to some embodiments of the present application, a user equipment (UE) is provided, which includes: a transceiver; and a processor coupled to the transceiver, wherein the processor is configured to: receive configuration information, indicating two sounding reference signal (SRS) source sets and two PHRs to be reported for an activated bandwidth part (BWP) of a serving cell, wherein a first SRS resource set of the two SRS source sets has a lower identifier than a second SRS resource set of the two SRS resource sets; and transmit the two PHRs according to two power control parameter sets associated with the two SRS resource sets for the serving cell, wherein, in the case that both the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or in the case that only one of the two PHRs to be reported is a virtual PHR, the first PHR is determined as an actual PHR associated with one of the two SRS resource sets, and the second PHR is determined according to one of the two power control parameter sets associated with the other one of the two SRS resource sets.

According to some other embodiments of the present application, a method performed in a UE is provided, which includes: receiving configuration information, indicating two SRS resource sets and two PHRs to be reported for an activated BWP of a serving cell, wherein a first SRS resource set of the two SRS source sets has a lower identifier than a second SRS resource set of the two SRS resource sets; and transmitting the two PHRs according to two power control parameter sets associated with the two SRS resource sets for the serving cell, wherein, in the case that both the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or in the case that only one of the two PHRs to be reported is a virtual PHR, the first PHR is determined as an actual PHR associated with one of the two SRS resource sets, and the second PHR is determined according to one of the two power control parameter sets associated with the other one of the two SRS resource sets.

In some embodiments of the present application, a first power control parameter set of the two power control parameter sets is associated with the first SRS resource set, wherein p0 and alpha in the first power control parameter set are determined from P0-PUSCH-AlphaSetId being 0 in p0-AlphaSet, closed loop index in the first power control parameter set is 0, and a pathloss reference signal (RS) in the first power control parameter set is a RS with PUSCH-PathlossReferenceRS-Id being 0; and a second power control parameter set of the two power control parameter set is associated with the second SRS resource set, wherein p0 and alpha in the second power control parameter set are determined from P0-PUSCH-AlphaSetId being 0 in p0-AlphaSet, closed loop index in the second power control parameter set is 0, and a pathloss RS in the second power control parameter set is a RS with PUSCH-PathlossReferenceRS-Id being 1. In addition, enablePL-RS-UpdateForPUSCH-SRS is not provided for the UE according to some embodiments of the present application.

In some embodiments of the present application, a first power control parameter set of the two power control parameter sets is associated with the first SRS resource set, wherein p0 and alpha in the first power control parameter set are determined from P0-PUSCH-AlphaSet being 0 in p0-AlphaSet, closed loop index in the first power control parameter set is 0, and a pathloss RS in the first power control parameter set is a RS with PUSCH-PathlossReferenceRS-Id being 0; and a second power control parameter set of the two power control parameter set is associated with the second SRS resource set, wherein p0 and alpha in the second power control parameter set are determined from P0-PUSCH-AlphaSetId being 1 in p0-AlphaSet, closed loop index in the second power control parameter set is 1 in the case of twoPUSCH-PC-AdjustmentStates being configured or is 0 in the case of twoPUSCH-PC-AdjustmentStates not being configured, and a pathloss RS in the second power control parameter set is a RS with PUSCH-PathlossReferenceRS-Id being 1. In addition, enablePL-RS-UpdateForPUSCH-SRS is not provided for the UE according to some embodiments of the present application.

In some embodiments of the present application, enablePL-RS-UpdateForPUSCH-SRS is provided for the UE; and a first power control parameter set of the two power control parameter sets is associated with the first SRS resource set, wherein p0 and alpha in the first power control parameter set are determined from P0-PUSCH-AlphaSetId being 0 in p0-AlphaSet, closed loop index in the first power control parameter set is 0, and a pathloss RS in the first power control parameter set is a RS with PUSCH-Pathloss-ReferenceRS-Id mapped to sri-PUSCH-PowerControlId being 0 of sri-PUSCH-MappingToAddModList; and a second power control parameter set of the two power control parameter set is associated with the second SRS resource set, wherein p0 and alpha in the second power control parameter set are determined from P0-PUSCH-AlphaSetId being 0 in p0-AlphaSet, closed loop index in the second power control parameter set is 0, and a pathloss RS in the second power control parameter set is a RS with PUSCH-PathlossReferenceRS-Id mapped to sri-PUSCH-PowerControlId being 0 of sri-PUSCH-MappingToAddModList2.

In some embodiments of the present application, enablePL-RS-UpdateForPUSCH-SRS is provided for the UE; and a first power control parameter set of the two power control parameter sets is associated with the first SRS resource set, wherein p0 and alpha in the first power control parameter set are determined from P0-PUSCH-AlphaSetId being 0 in p0-AlphaSet, closed loop index in the first power control parameter set is 0, and a pathloss RS in the first power control parameter set is a RS with PUSCH-Pathloss-ReferenceRS-Id mapped to sri-PUSCH-PowerControlId being 0 of sri-PUSCH-MappingToAddModList; and a second power control parameter set of the two power control parameter set is associated with the second SRS resource set, wherein p0 and alpha in the second power control parameter set are determined from P0-PUSCH-AlphaSetId being 1 in p0-AlphaSet, closed loop index in the second power control parameter set is 1 in the case of twoPUSCH-PC-AdjustmentStates being configured or is 0 in the case of two-PUSCH-PC-AdjustmentStates not being configured, and a pathloss RS in the second power control parameter set is a RS with PUSCH-PathlossReferenceRS-Id mapped to sri-PUSCH-PowerControlId=0 of sri-PUSCH-MappingToAddModList2.

In some embodiments of the present application, in the case that both the two PHRs to be reported are virtual PHRs, the first PHR is determined based on one of the two power control parameter sets associated with the first SRS resource set and the second PHR is determined according to the other of the two power control parameter sets associated with the second SRS resource set.

According to some yet other embodiments of the present application, a radio access network (RAN) node is provided, which includes: a transceiver; and a processor coupled to the transceiver, wherein the processor is configured to: transmit configuration information, indicating two SRS resource sets and two PHRs to be reported for an activated BWP of a serving cell, wherein a first SRS resource set of the two SRS source sets has a lower identifier than a second SRS resource set of the two SRS resource sets; and receive the two PHRs according to two power control parameter sets associated with the two SRS resource sets for the serving cell, wherein, in the case that both the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or in the case that only one of the two PHRs to be reported is a virtual PHR, the first PHR is determined as an actual PHR associated with one of the two SRS resource sets, and the second PHR is determined according to one of the two power control parameter sets associated with the other one of the two SRS resource sets.

Embodiments of the present application provide a technical solution of PHR reporting for multi-TRP transmission, supporting two PHRs for multi-TRP based PUSCH, and thus can enhance reliability and robustness for multi-TRP based PUSCH.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. It is contemplated that along with the developments of network architectures and new service scenarios, all embodiments in the present application are also applicable to similar technical problems. Moreover, the terminologies recited in the present application may change, which should not affect the principle of the present application.

A wireless communication system generally includes one or more base stations (BSs) and one or more UE. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, a single TRP can be used to serve one or more UE under the control of a BS. In different scenarios, a TRP may be referred to as different terms. Persons skilled in the art should understand that as 3GPP and the communication technology develop, the terminologies recited in the specification may change, which should not affect the scope of the present application. It should be understood that the TRP(s) (or panel(s)) configured for the BS may be transparent to a UE.

Figure 1:
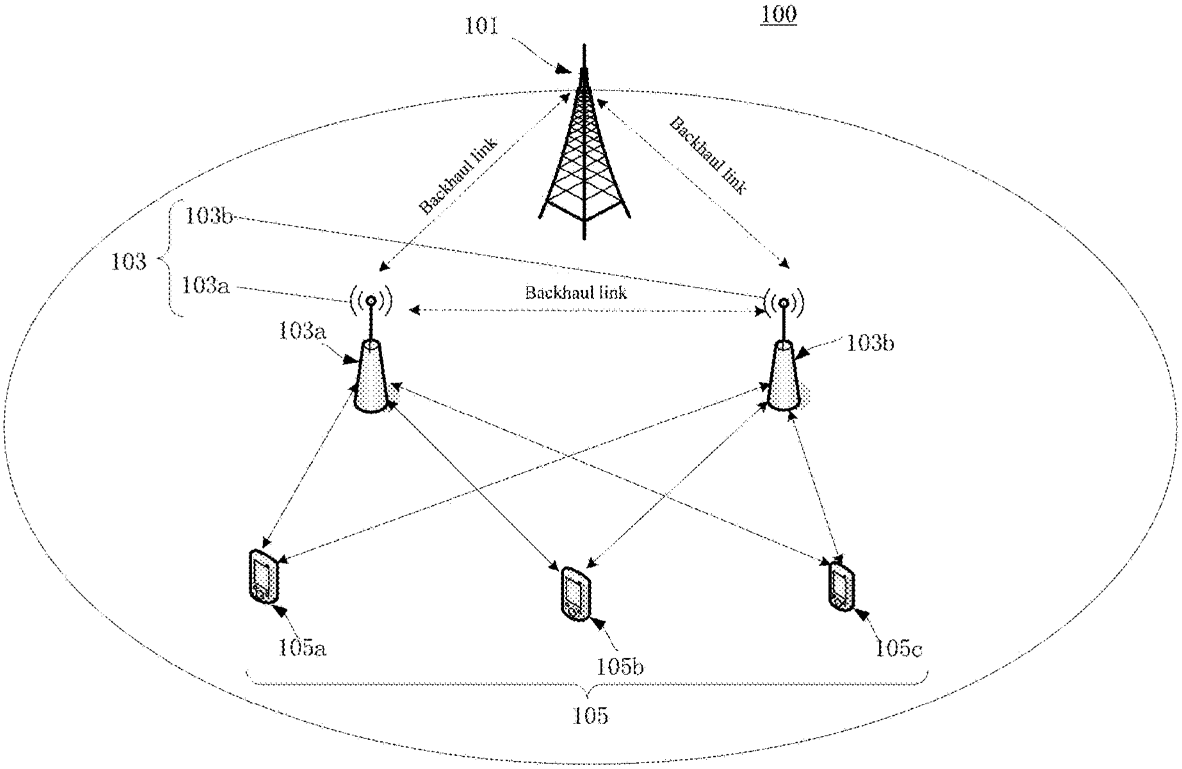
FIG. 1 is a schematic diagram illustrating an exemplary wireless communication system according to an embodiment of the present application.

FIG. 1 is a schematic diagram illustrating an exemplary wireless communication system 100 according to some embodiments of the present application.

Referring to FIG. 1, a wireless communication system 100 can include a base station (BS) 101, TRPs 103 (e.g., a first TRP 103*a* and a second TRP 103*b*), and UEs 105 (e.g., a first UE 105*a*, a second UE 105*b*, and a third UE 105*c*). Although only one base station 101, two TRPs 103 and three UEs 105 are shown for simplicity, it should be noted that the wireless communication system 100 may include more or less communication device(s) or apparatus in accordance with some other embodiments of the present application.

In some embodiments of the present application, a BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the first UE 105*a*, the second UE 105*b*, and the third UE 105*c*) may include, for example, but is not limited to, a computing device, a wearable device, a mobile device, an IoT device, a vehicle, etc.

The TRPs 103, for example, the first TRP 103*a* and the second TRP 103*b* can communicate with the base station 101 via, for example, a backhaul link. Each of TRPs 103 can serve some or all of UEs 105. As shown in FIG. 1, the first TRP 103*a* can serve some mobile stations (which include the first UE 105*a*, the second UE 105*b*, and the third UE 105*c*) within a serving area or region (e.g., a cell or a cell sector). The second TRP 103*b* can serve some mobile stations (which include the first UE 105*a*, the second UE 105*b*, and the third UE 105*c*) within a serving area or region (e.g., a cell or a cell sector). The first TRP 103*a* and the second TRP 103*b* can communicate with each other via, for example, a backhaul link.

A multi-TRP transmission (or operation) may refer to at least two TRPs (or panels) to transmit data to a UE. As shown in FIG. 1, for the same UE 105 (e.g., the first UE 105*a*, the second UE 105*b*, or the third UE 105*c*), two TRPs (e.g., the first TRP 103*a* and the second TRP 103*b*) may both transmit data to it, which is an exemplary scenario of multi-TRP transmission.

Regarding PHR reporting related to multi-TRP PUSCH, it is agreed that UE optional capability for a UE that supports multi-TRP PUSCH will be: calculating two PHRs (at least corresponding to the carrier component (CC) that applies M-TRP PUSCH repetitions), each associated with a first PUSCH occasion to each TRP, and reporting two PHRs. That is, two PHRs can be reported for multi-TRP based PUSCH. One manner of Type 1 virtual PHR calculation is drafted in TS38.213 v17.0.0 as follows:

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l)=\tilde{P}_{CMAX,f,c}(i)-\{P_{O\_PUSCH,b,f,c}(j)+\alpha_{b,f,c}(j)\cdot PL_{b,f,c}(q_d)+f_{b,f,c}(i,l)\}\text{ [dB]}$$

where $\tilde{P}_{CMAX,f,c}(i)$ is computed assuming MPR=0 dB, A-MPR=0 dB, P-MPR=0 dB. □TC=0 dB. MPR, A-MPR, P-MPR and TC are defined in [8-1, TS 38.101-1], [8-2, TS38.101-2] and [8-3, TS 38.101-3]. The remaining parameters are defined in clause 7.1.1 where $P_{O\_PUSCH,b,f,c}(j)$ and $\alpha_{b,f,c}(j)$ are obtained using $P_{O\_NOMINAL,PUSCH,f,c}(0)$ and p0-PUSCH-Alpha-SetId=0, $PL_{b,f,c}(q_d)$ is obtained using pusch-Pathloss-ReferenceRS-Id=0, and l=0.

In addition, TS38.213 v17.0.0 also specifies:

If a UE transmits a PUSCH associated with a first RS resource index $q_d$, as described in clause 7.1.1, on active UL BWP b of carrier f of serving cell c in slot n and is provided twoPHRMode, the UE provides a Type 1 power headroom report for PUSCH repetition associated with a second RS resource index $q_d$, as described in clause 7.1.1, where

- if the UE provides a Type 1 power headroom report for an actual PUSCH repetition associated with the first RS resource index $q_d$,
- if the UE transmits PUSCH repetitions associated with the second RS resource index $q_d$ in slot n, the UE provides a Type 1 power headroom report for a first actual PUSCH repetition associated with the second RS resource index $q_d$ that overlaps with slot n
- otherwise, the UE provides a Type 1 power headroom report for a reference PUSCH transmission associated with the second RS resource index $q_d$
- otherwise, if the UE provides a Type 1 power headroom report for a reference PUSCH transmission associated with the first RS resource index $q_d$, the UE provides a Type 1 power headroom report for a reference PUSCH transmission associated with the second RS resource index $q_d$.

According to the above specification, in case of calculating two virtual PHRs to different TRPs, only pathloss (PL) RSs are different, while other power control parameters, including p0, alpha, and closed loop index etc., are the same.

However, it is only agreed that when the second PHR is virtual, the second PHR is calculated based on a set of power control parameters defined for the other TRP (that is not associated with the first PHR). No further agreement on how to determine what the set of power control parameters is. Although there is a default power control parameter set defined when one SRS resource per SRS resource set (or SRS set) is configured (i.e., when two SRI fields are absent in DCI formats 0_1/0_2) in Rel-17 agreement, it is still unclear that the power control parameter set defined for one SRS resource per SRS resource set (two SRI fields are absent in DCI formats 2_1/0_2) is used for the virtual PHR calculation. Besides, the current agreement only mentions how to determine the virtual PHR if the first PHR is an actual PHR and the second PHR is the virtual PHR but does not mention how to determine the first virtual PHR and the second virtual PHR if two virtual PHRs are determined. Herein, the first PHR and second PHR are two PHRs reported in sequence e.g., in a PHR media access control (MAC) control element (CE) when "twoPHRMode" is set as "enabled." For example, the first PHR is the first reported one of the two PHRs in PHR MAC CE, while the second PHR is the second reported one of the two PHRs in the same MAC CE.

At least for solving the above technical problems, embodiments of the present application provide a technical solution of PHR reporting, e.g., a method and an apparatus of PHR reporting for multi-TRP based PUSCH. All embodiments of the present application illustrated herein is under the premise that "twoPHRMode" is set as 'enabled' in a cell, which means that UE needs to report two PHRs for the cell to the gNB.

Figure 2:
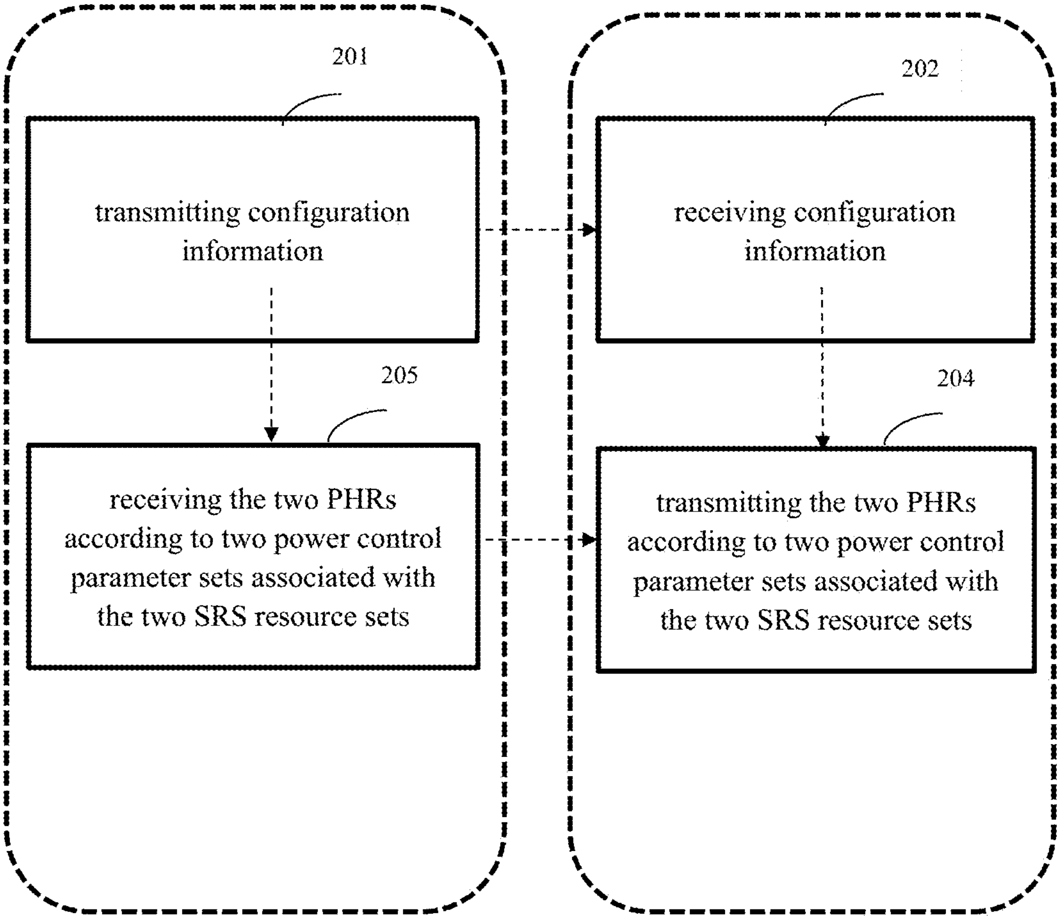
FIG. 2 illustrates a flow chart of a method of PHR reporting according to some embodiments of the present application.

FIG. 2 illustrates a flow chart of a method of PHR reporting according to some embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with similar functions. In addition, no transmission or reception failure is considered in the illustrated embodiments of the present application.

Referring to FIG. 2, the network side, e.g., a gNB may transmit configuration information to the remote side, e.g., to a UE in step 201. Accordingly, the network side will receive the configuration information in step 202. The configuration information may include but not be limited to configuration information on the SRS resource sets and configuration information on PHR reporting mode. For example, "twoPHRMode" is set as 'enabled' in a cell, and two SRS resource sets are configured for PUSCH transmission for an activated BWP of the cell. One of the two SRS resource sets with a lower identifier (ID) is referred to as the first SRS resource set, and the other one of the two SRS resource sets with a higher ID is referred to as the second first SRS resource set. Each SRS resource set may be associated with a TRP in a scenario of multi-TRP transmission.

The UE will determine the power control parameter set associated with each SRS resource set, and calculate the PHR according to the determined power control parameter set. In step 204, the UE will transmit two PHRs for the cell to the gNB according to two determined power control parameter sets associated with the two SRS resource sets. Accordingly, the gNB will receive the two PHRs for the cell in step 205. The two PHRs may be two virtual PHRs, or one virtual PHR and one actual PHR, or two actual PHRs. Since only virtual PHR determination is disclosed in the present application, the case of two actual PHRs will not be considered in embodiments of the present application.

In the case that both the two PHRs to be reported are virtual PHRs, the first PHR of the two PHRs is determined based on one of the two power control parameter sets associated with one of the two SRS resource sets and the second PHR of the two PHRs is determined according to the other one of the two power control parameter sets associated with the other one of the two SRS resource sets. For example, the first PHR is determined based on the first power control parameter sets associated with the first SRS resource set and the second PHR is determined according to the second power control parameter set associated with the second SRS resource set.

In the case that only one of the two PHRs to be reported is a virtual PHR, the first PHR is an actual PHR and the second PHR is a virtual PHR. The first PHR will be determined as an actual PHR associated with one of the two SRS resource sets, and the second PHR will be determined according to one of the two power control parameter sets associated with the other one of the two SRS resource set. That is, if the actual PUSCH for calculating the actual PHR, i.e., the first PHR is associated with the first SRS resource set, then the virtual PHR, i.e., the second PHR is calculated according to the second power control parameter set associated with the second SRS resource set. If the actual PUSCH for calculating the actual PHR, i.e., the first PHR is associated with the second SRS resource set, then the virtual PHR, i.e., the second PHR is calculated according to the first power control parameter set associated with the first SRS resource set.

Regarding a power control parameter set for each virtual PHR, it mainly includes: pathloss RS, and other power control parameters except for pathloss RS, e.g., p0, alpha, and closed loop index. That is, a power control parameter set is composed of a pathloss RS and other power control parameters except for the pathloss RS, which is associated with a SRS resource set. For example, a first power control parameter set may be associated with the first SRS source set, and a second power control parameter set is associated with the second SRS resource set.

Schemes of determining pathloss RS and determining other power control parameters except for pathloss RS will be illustrated in detail in view of various embodiments of the present application.

Pathloss RS

According to some embodiments of the present application, the two pathloss RS is determined without considering any additional condition. For example, the first pathloss RS of the first power control parameter set associated with the first SRS resource set is a RS with PUSCH-PathlossReferenceRS-Id being 0. The second pathloss RS of the second power control parameter set associated with the second SRS resource set is a RS with PUSCH-PathlossReferenceRS-Id being 1.

According to some embodiments of the present application, whether "enablePL-RS-UpdateForPUSCH-SRS" is provided for UE will be determined. For example, in some scenarios, "enablePL-RS-UpdateForPUSCH-SRS" is provided for the UE. The first pathloss RS of the first power control parameter set associated with the first SRS resource set is a RS with PUSCH-PathlossReferenceRS-Id mapped to sri-PUSCH-PowerControlId=0 of sri-PUSCH-MappingToAddModList. The second pathloss RS of the second power control parameter set associated with the second SRS resource set is a RS with PUSCH-PathlossReferenceRS-Id mapped to sri-PUSCH-PowerControlId=0 of sri-PUSCH-MappingToAddModList2.

In some other scenarios, "enablePL-RS-UpdateForPUSCH-SRS" is not provided for the UE. The first pathloss RS of the first power control parameter set associated with the first SRS resource set is a RS with PUSCH-PathlossReferenceRS-Id being 0, and the second pathloss RS of the first power control parameter set associated with the second SRS resource set is a RS with PUSCH-PathlossReferenceRS-Id being 1.

In some other embodiments of the present application, the pathloss RS determined for the first power control parameter set and the second power control parameter set can be exchanged compared with the above illustrated manner. For example, the first pathloss RS of the first power control parameter set associated with the first SRS resource set is a RS with PUSCH-PathlossReferenceRS-Id being 1. The second pathloss RS of the second power control parameter set associated with the second SRS resource set is a RS with PUSCH-PathlossReferenceRS-Id being 0. In addition, persons skilled in the art should well know that the wording "first pathloss RS" and "second pathloss RS" are only for differentiating two pathloss RSs, and should not be deemed as additional limitation to the pathloss RS. It is similar to the first power control parameter and the second power control parameter.

Other Power Control Parameters Except for Pathloss RS

Regarding other power control parameter for calculating a virtual PHR, only p0, alpha and closed loop index are considered herein.

According to some embodiments of the present application, p0, alpha and closed loop index of the first power control parameter set associated with the first SRS resource set and the second power control parameter set associated with the second SRS resource set may be determined in different manners. For example, p0 and alpha of the first power control parameter set associated with the first SRS resource set are determined from the first value in P0-PUSCH-AlphaSet in p0-AlphaSet, e.g., P0-PUSCH-AlphaSetId being 0. Closed loop index of the first power control parameter set is 0. P0 and alpha of the second power control parameter set associated with the second SRS resource set are determined from the second value in P0-PUSCH-AlphaSet in p0-AlphaSet, e.g., P0-PUSCH-AlphaSetId being 1. Regarding closed loop index of the second power control parameter set, it depends on whether "twoPUSCH-PC-AdjustmentStates" is configured. In the case of "twoPUSCH-PC-AdjustmentStates" being configured, closed loop index of the second power control parameter set is 1; otherwise, closed loop index of the second power control parameter set is 0.

According to some embodiments of the present application, p0, alpha and closed loop index of the first power control parameter set associated with the first SRS resource set and the second power control parameter set associated with the second SRS resource set may be determined in the same manner. For example, p0 and alpha of the first power control parameter set associated with the first SRS resource set are determined from the first value in P0-PUSCH-AlphaSet in p0-AlphaSet, e.g., P0-PUSCH-AlphaSetId being 0. Closed loop index of the first power control parameter set is 0. P0, alpha and closed loop index of the second power control parameter set associated with the second SRS resource set are the same as the first power control parameter set associated with the first SRS resource set.

Given the above, two power control parameter sets associated with two SRS resource sets can be determined in various manners as illustrated in the following.

In some embodiments of the present application, no condition will be additionally considered when determining the pathloss RS, p0, alpha and closed loop index. For example, for the first power control parameter set associated with the first SRS resource set, p0 and alpha are determined from P0-PUSCH-AlphaSetId being 0 in p0-AlphaSet, closed loop index is 0, and the first pathloss RS is a RS with PUSCH-PathlossReferenceRS-Id being 0. For the second power control parameter set associated with the second SRS resource set, p0 and alpha are determined from P0-PUSCH-AlphaSetId being 0 in p0-AlphaSet, closed loop index is 0, and the second pathloss RS is a RS with PUSCH-PathlossReferenceRS-Id being 1. That is, the first power control parameter set and the second power control parameter set have the same p0, alpha and closed loop index, and only differ in the pathloss RS.

In some other embodiments of the present application, whether "enablePL-RS-UpdateForPUSCH-SRS" is not provided for the UE will be considered when determining the pathloss RS; while no condition will be additionally considered when determining P0, alpha and closed loop index. When "enablePL-RS-UpdateForPUSCH-SRS" is not provided for the UE, for the first power control parameter set associated with the first SRS resource set, p0 and alpha are determined from P0-PUSCH-AlphaSetId being 0 in p0-AlphaSet, closed loop index is 0, and the first pathloss RS is a RS with PUSCH-PathlossReferenceRS-Id being 0; and for the second power control parameter set associated with the second SRS resource set, p0 and alpha are determined from P0-PUSCH-AlphaSetId being 0 in p0-AlphaSet, closed loop index is 0, and a pathloss RS is a RS with PUSCH-PathlossReferenceRS-Id being 1. That is, the first power control parameter set and the second power control parameter set have the same p0, alpha and closed loop index, and only differ in the pathloss RS. When "enablePL-RS-UpdateForPUSCH-SRS" is provided for the UE, for the first power control parameter set, p0 and alpha are determined from P0-PUSCH-AlphaSetId being 0 in p0-AlphaSet, closed loop index is 0, and the first pathloss RS is a RS with PUSCH-PathlossReferenceRS-Id mapped to sri-PUSCH-PowerControlId being 0 of sri-PUSCH-MappingToAddModList; and for the second power control parameter set, p0 and alpha are determined from P0-PUSCH-AlphaSetId being 0 in p0-AlphaSet, closed loop index is 0, and the second pathloss RS is a RS with PUSCH-PathlossReferenceRS-Id mapped to sri-PUSCH-PowerControlId=0 of sri-PUSCH-MappingToAddModList2.

In some yet other embodiments of the present application, no condition will be additionally considered when determining the pathloss RS, p0, and alpha, while whether "twoPUSCH-PC-AdjustmentStates" is configured will be considered when determining closed loop index of the second power control parameter set. For example, for the first power control parameter set, p0 and alpha are determined from P0-PUSCH-AlphaSet being 0 in p0-AlphaSet, closed loop index is 0, and the first pathloss RS is a RS with PUSCH-PathlossReferenceRS-Id being 0; and for the second power control parameter set, p0 and alpha are determined from P0-PUSCH-AlphaSetId being 1 in p0-AlphaSet, closed loop index is 1 in the case of twoPUSCH-PC-AdjustmentStates being configured or is 0 in the case of twoPUSCH-PC-AdjustmentStates not being configured, and the second pathloss RS is a RS with PUSCH-PathlossReferenceRS-Id being 1.

In some yet other embodiments of the present application, whether "enablePL-RS-UpdateForPUSCH-SRS" is not provided for the UE will be considered when determining the pathloss RS, and whether "twoPUSCH-PC-AdjustmentStates" is configured will be considered when determining closed loop index of the second power control parameter set. For example, when "enablePL-RS-UpdateForPUSCH-SRS" is not provided for the UE, for the first power control parameter set, p0 and alpha are determined from P0-PUSCH-AlphaSet being 0 in p0-AlphaSet, closed loop index is 0, and the first pathloss RS is a RS with PUSCH-PathlossReferenceRS-Id being 0; and for the second power control parameter set, p0 and alpha are determined from P0-PUSCH-AlphaSetId being 1 in p0-AlphaSet, closed loop index is 1 in the case of twoPUSCH-PC-AdjustmentStates being configured or is 0 in the case of twoPUSCH-PC-AdjustmentStates not being configured, and the second pathloss RS is a RS with PUSCH-PathlossReferenceRS-Id being 1. When enablePL-RS-UpdateForPUSCH-SRS is provided for the UE, for the first power control parameter set, p0 and alpha are determined from P0-PUSCH-AlphaSetId being 0 in p0-AlphaSet, closed loop index is 0, and the first pathloss RS is a RS with PUSCH-PathlossReferenceRS-Id mapped to sri-PUSCH-PowerControlId being 0 of sri-PUSCH-MappingToAddModList; and for the second power control parameter set, p0 and alpha are determined from P0-PUSCH-AlphaSetId being 1 in p0-AlphaSet, closed loop index is 1 in the case of twoPUSCH-PC-AdjustmentStates being configured or is 0 in the case of twoPUSCH-PC-AdjustmentStates not being configured, and the second pathloss RS is a RS with PUSCH-PathlossReferenceRS-Id mapped to sri-PUSCH-PowerControlId=0 of sri-PUSCH-MappingToAddModList2.

Based on the power control parameter set associated with each SRS source set, when a PHR associated with a SRS source set is a virtual PHR, the virtual PHR will be determined according to the power control parameter set associated with the corresponding SRS source set.

Specifically, if two PHRs respectively associated with the first SRS source set and the second SRS source set are virtual PHR, they will respectively be calculated based on the first power control parameter and the second power control set. For example, the first PHR is determined based on the first power control parameter sets associated with the first SRS resource set and the second PHR is determined according to the second power control parameter set associated with the second SRS resource set.

If only one of the two PHRs to be reported is a virtual PHR, the first PHR is an actual PHR and the second PHR is a virtual PHR. The first PHR will be determined as an actual PHR associated with one of the two SRS resource sets, and the second PHR will be determined according to one of the two power control parameter sets associated with the other one of the two SRS resource set. For example, if the first PHR is associated with the first SRS resource set, then the second PHR is calculated according to the second power control parameter set associated with the second SRS resource set. If the first PHR is associated with the second SRS resource set, then the second PHR is calculated according to the first power control parameter set associated with the first SRS resource set.

Besides the methods, embodiments of the present application also propose an apparatus of PHR reporting.

Figure 3:
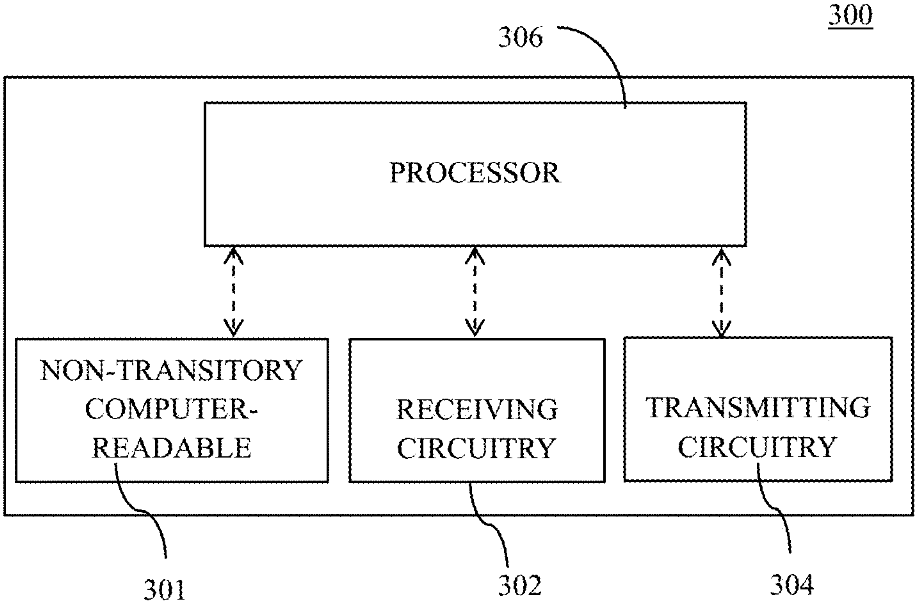
FIG. 3 illustrates a block diagram of an apparatus of PHR reporting according to some embodiments of the present application.

For example, FIG. 3 illustrates a block diagram of an apparatus of PHR reporting 300 according to some embodiments of the present application.

As shown in FIG. 3, the apparatus 300 may include at least one non-transitory computer-readable medium 301, at least one receiving circuitry 302, at least one transmitting circuitry 304, and at least one processor 306 coupled to the non-transitory computer-readable medium 301, the receiving circuitry 302 and the transmitting circuitry 304. The at least one processor 306 may be a CPU, a DSP, a microprocessor etc. The apparatus 300 may be a RAN node, e.g., a gNB or a remote apparatus, e.g., UE configured to perform a method illustrated in the above or the like.

Although in this figure, elements such as the at least one processor 306, transmitting circuitry 304, and receiving circuitry 302 are described in the singular, the plural is contemplated unless a limitation to the singular is explicitly stated. In some embodiments of the present application, the receiving circuitry 302 and the transmitting circuitry 304 can be combined into a single device, such as a transceiver. In certain embodiments of the present application, the apparatus 300 may further include an input device, a memory, and/or other components.

In some embodiments of the present application, the non-transitory computer-readable medium 301 may have stored thereon computer-executable instructions to cause a processor to implement the method with respect to the network apparatus as described above. For example, the computer-executable instructions, when executed, cause the processor 306 interacting with receiving circuitry 302 and transmitting circuitry 304, so as to perform the steps with respect to the network apparatus as depicted above.

In some embodiments of the present application, the non-transitory computer-readable medium 301 may have stored thereon computer-executable instructions to cause a processor to implement the method with respect to the UE as described above. For example, the computer-executable instructions, when executed, cause the processor 306 interacting with receiving circuitry 302 and transmitting circuitry 304, so as to perform the steps with respect to the UE as illustrated above.

Figure 4:
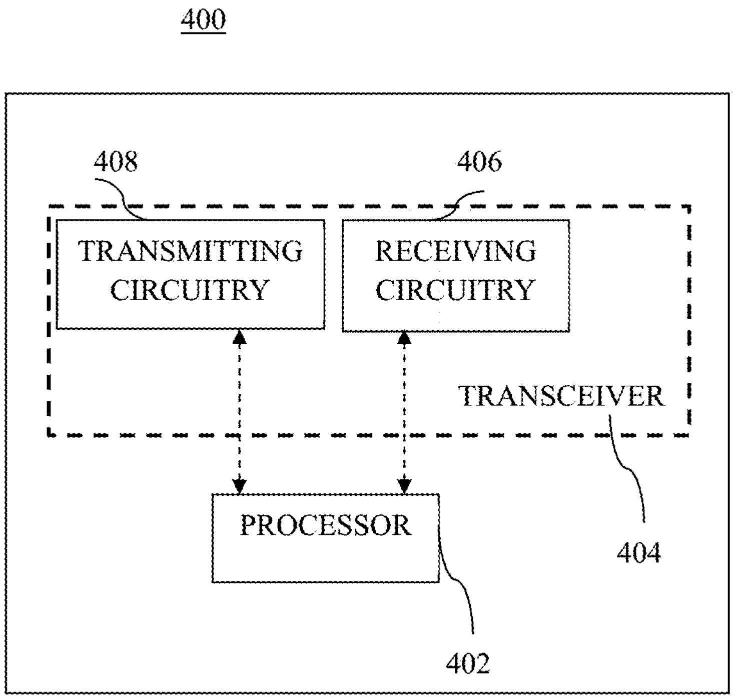
FIG. 4 illustrates a block diagram of an apparatus of PHR reporting according to some other embodiments of the present application.

FIG. 4 is a block diagram of an apparatus of PHR reporting according to some other embodiments of the present application.

Referring to FIG. 4, the apparatus 400, for example a gNB or a UE may include at least one processor 402 and at least one transceiver 404 coupled to the at least one processor 402. The transceiver 404 may include at least one separate receiving circuitry 406 and transmitting circuitry 404, or at least one integrated receiving circuitry 406 and transmitting circuitry 404. The at least one processor 402 may be a CPU, a DSP, a microprocessor etc.

According to some embodiments of the present application, when the apparatus 400 is a remote apparatus, e.g., a UE, the processor is configured to: receive configuration information, indicating two SRS resource sets and two PHRs to be reported for an activated BWP of a serving cell, wherein a first SRS resource set of the two SRS source sets has a lower identifier than a second SRS resource set of the two SRS resource sets; and transmit the two PHRs according to two power control parameter sets associated with the two SRS resource sets for the serving cell, wherein, in the case that both the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or in the case that only one of the two PHRs to be reported is a virtual PHR, the first PHR is determined as an actual PHR associated with one of the two SRS resource sets, and the second PHR is determined according to one of the two power control parameter sets associated with the other one of the two SRS resource set.

According to some other embodiments of the present application, when the apparatus 400 is a RAN node, e.g., a gNB, the processor may be configured to: transmit configuration information, indicating two SRS resource sets and two PHRs to be reported for an activated BWP of a serving cell, wherein a first SRS resource set of the two SRS resource sets has a lower identifier than a second SRS resource set of the two SRS resource sets; and receive the two PHRs according to two power control parameter sets associated with the two SRS resource sets for the serving cell, wherein, in the case that both the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or in the case that only one of the two PHRs to be reported is a virtual PHR, the first PHR is determined as an actual PHR associated with one of the two SRS resource sets, and the second PHR is determined according to one of the two power control parameter sets associated with the other one of the two SRS resource sets.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device capable of implementing the flowcharts shown in the figures may be used to implement the processor functions of this application. For example, an embodiment of the present application provides an apparatus, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed:

1. A user equipment (UE) for wireless communication, comprising:

at least one memory; and at least one processor coupled with the at least one memory and configured to cause the UE to:

receive configuration information, indicating two sounding reference signal (SRS) resource sets and two power headroom reports (PHRs) to be reported for an activated bandwidth part of a serving cell, wherein a first SRS resource set of the two SRS source sets has a lower identifier than a second SRS resource set of the two SRS resource sets; and transmit the two PHRs according to two power control parameter sets associated with the two SRS resource sets for the serving cell, wherein, when both of the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or when only one of the two PHRs to be reported is a virtual PHR, the first PHR is determined as an actual PHR associated with one of the two SRS resource sets, and the second PHR is determined according to one of the two power control parameter sets associated with the other one of the two SRS resource set, wherein a first power control parameter set of the two power control parameter sets is associated with the first SRS resource set, wherein p0 and alpha in the first power control parameter set are determined from P0-PUSCH-AlphaSet being 0 in p0-AlphaSet, a closed loop index in the first power control parameter set is 0, and a pathloss reference signal (RS) in the first power control parameter set is a RS with PUSCH-Pathloss-ReferenceRS-Id being 0;

a second power control parameter set of the two power control parameter set is associated with the second SRS resource set, wherein p0 and alpha in the second power control parameter set are determined from P0-PUSCH-AlphaSetId being 1 in p0-AlphaSet, a closed loop index in the second power control parameter set is 1 in the case of twoPUSCH-PC-AdjustmentStates being configured or is 0 in the case of twoPUSCH-PC-AdjustmentStates not being configured, and a pathloss RS in the second power control parameter set is a RS with PUSCH-PathlossReferenceRS-Id being 1; and enablePL-RS-UpdateForPUSCH-SRS is not provided for the UE.

2. The UE of claim 1, wherein, when both of the two PHRs to be reported are virtual PHRs, the first PHR is determined based on one of the two power control parameter sets associated with the first SRS resource set and the second PHR is determined according to the other of the two power control parameter sets associated with the second SRS resource set.

3. A radio access network (RAN) node for wireless communication, comprising:

at least one memory; and at least one processor coupled with the at least one memory and configured to cause the RAN node to:

transmit configuration information, indicating two sounding reference signal (SRS) resource sets and two power headroom reports (PHRs) to be reported for an activated bandwidth part of a serving cell, wherein a first SRS resource set of the two SRS resource sets has a lower identifier than a second SRS resource set of the two SRS resource sets; and receive the two PHRs according to two power control parameter sets associated with the two SRS resource sets for the serving cell, wherein, when both of the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or when only one of the two PHRs to be reported is a virtual PHR, the first PHR is determined as an actual PHR associated with one of the two SRS resource sets, and the second PHR is determined according to one of the two power control parameter sets associated with the other one of the two SRS resource sets, wherein a first power control parameter set of the two power control parameter sets is associated with the first SRS resource set, wherein p0 and alpha in the first power control parameter set are determined from P0-PUSCH-AlphaSet being 0 in p0-AlphaSet, a closed loop index in the first power control parameter set is 0, and a pathloss reference signal (RS) in the first power control parameter set is a RS with PUSCH-Pathloss-ReferenceRS-Id being 0;

a second power control parameter set of the two power control parameter set is associated with the second SRS resource set, wherein p0 and alpha in the second power control parameter set are determined from P0-PUSCH-AlphaSetId being 1 in p0-AlphaSet, a closed loop index in the second power control parameter set is 1 in the case of twoPUSCH-PC-AdjustmentStates being configured or is 0 in the case of twoPUSCH-PC-AdjustmentStates not being configured, and a pathloss RS in the second power control parameter set is a RS with PUSCH-PathlossReferenceRS-Id being 1; and enablePL-RS-UpdateForPUSCH-SRS is not provided for the UE.

4. The RAN node of claim 3, wherein, when both of the two PHRs to be reported are virtual PHRs, the first PHR is determined based on one of the two power control parameter sets associated with the first SRS resource set and the second PHR is determined according to the other of the two power control parameter sets associated with the second SRS resource set.

5. A method performed by a user equipment (UE), the method comprising:

receiving configuration information, indicating two sounding reference signal (SRS) resource sets and two power headroom reports (PHRs) to be reported for an activated bandwidth part of a serving cell, wherein a first SRS resource set of the two SRS source set has a lower identifier than a second SRS resource set of the two SRS resource sets; and transmitting the two PHRs according to two power control parameter sets associated with the two SRS resource sets for the serving cell, wherein, when both of the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or when only one of the two PHRs to be reported is a virtual PHR, the first PHR is determined as an actual PHR associated with one of the two SRS resource sets, and the second PHR is determined according to one of the two power control parameter sets associated with the other one of the two SRS resource set, wherein a first power control parameter set of the two power control parameter sets is associated with the first SRS resource set, wherein p0 and alpha in the first power control parameter set are determined from P0-PUSCH-AlphaSet being 0 in p-AlphaSet, a closed loop index in the first power control parameter set is 0, and a pathloss reference signal (RS) in the first power control parameter set is a RS with PUSCH-Pathloss-ReferenceRS-Id being 0;

a second power control parameter set of the two power control parameter set is associated with the second SRS resource set, wherein p0 and alpha in the second power control parameter set are determined from P0-PUSCH-AlphaSetId being 1 in p0-AlphaSet, a closed loop index in the second power control parameter set is 1 in the case of twoPUSCH-PC-AdjustmentStates being configured or is 0 in the case of twoPUSCH-PC-AdjustmentStates not being configured, and a pathloss RS in the second power control parameter set is a RS with PUSCH-PathlossReferenceRS-Id being 1; and enablePL-RS-UpdateForPUSCH-SRS is not provided for the UE.

6. The method of claim 5, wherein, when both of the two PHRs to be reported are virtual PHRs, the first PHR is determined based on one of the two power control parameter sets associated with the first SRS resource set and the second PHR is determined according to the other of the two power control parameter sets associated with the second SRS resource set.

7. A processor for wireless communication, comprising:

at least one controller coupled with at least one memory and configured to cause the processor to:

receive configuration information, indicating two sounding reference signal (SRS) resource sets and two power headroom reports (PHRs) to be reported for an activated bandwidth part of a serving cell, wherein a first SRS resource set of the two SRS source sets has a lower identifier than a second SRS resource set of the two SRS resource sets; and transmit the two PHRs according to two power control parameter sets associated with the two SRS resource sets for the serving cell, wherein, when both of the two PHRs to be reported are virtual PHRs, a first PHR of the two PHRs is determined based on one of the two power control parameter sets associated with one of the two SRS resource sets and a second PHR of the two PHRs is determined according to the other one of the two power control parameter sets associated with the other one of the two SRS resource sets; or when only one of the two PHRs to be reported is a virtual PHR, the first PHR is determined as an actual PHR associated with one of the two SRS resource sets, and the second PHR is determined according to one of the two power control parameter sets associated with the other one of the two SRS resource set, wherein a first power control parameter set of the two power control parameter sets is associated with the first SRS resource set, wherein p0 and alpha in the first power control parameter set are determined from P0-PUSCH-AlphaSet being 0 in p0-AlphaSet, a closed loop index in the first power control parameter set is 0, and a pathloss reference signal (RS) in the first power control parameter set is a RS with PUSCH-Pathloss-ReferenceRS-Id being 0;

a second power control parameter set of the two power control parameter set is associated with the second SRS resource set, wherein p0 and alpha in the second power control parameter set are determined from P0-PUSCH-AlphaSetId being 1 in p0-AlphaSet, a closed loop index in the second power control parameter set is 1 in the case of twoPUSCH-PC-AdjustmentStates being configured or is 0 in the case of twoPUSCH-PC-AdjustmentStates not being configured, and a pathloss RS in the second power control parameter set is a RS with PUSCH-PathlossReferenceRS-Id being 1; and enablePL-RS-UpdateForPUSCH-SRS is not provided for the UE.

8. The processor of claim 7, wherein, when both of the two PHRs to be reported are virtual PHRs, the first PHR is determined based on one of the two power control parameter sets associated with the first SRS resource set and the second PHR is determined according to the other of the two power control parameter sets associated with the second SRS resource set.

* * * * *